United States Patent
Hasegawa

(10) Patent No.: US 10,488,517 B2
(45) Date of Patent: Nov. 26, 2019

(54) METHOD AND APPARATUS FOR RECOGNIZING VEHICLES USING LASER BEAM SCANNING

(71) Applicant: DENSO WAVE INCORPORATED, Chita-gun, Aichi-pref. (JP)

(72) Inventor: Yuki Hasegawa, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 0 days.

(21) Appl. No.: 15/939,702

(22) Filed: Mar. 29, 2018

(65) Prior Publication Data
US 2018/0364357 A1   Dec. 20, 2018

(30) Foreign Application Priority Data

Jun. 16, 2017  (JP) ................ 2017-119081

(51) Int. Cl.
| | |
|---|---|
| *G01S 17/42* | (2006.01) |
| *G01B 11/25* | (2006.01) |
| *G01S 7/491* | (2006.01) |
| *G06F 17/11* | (2006.01) |
| *G01S 17/66* | (2006.01) |
| *G01S 17/93* | (2006.01) |
| *G01S 7/48* | (2006.01) |

(52) U.S. Cl.
CPC .......... *G01S 17/42* (2013.01); *G01B 11/2518* (2013.01); *G01S 7/4808* (2013.01); *G01S 7/4911* (2013.01); *G01S 7/4912* (2013.01); *G01S 17/66* (2013.01); *G01S 17/936* (2013.01); *G06F 17/11* (2013.01)

(58) Field of Classification Search
CPC ............... G01S 13/931; G01S 13/4445; G01S 13/4454; G01S 2013/9375; G01S 7/481; G01S 7/497; G01S 17/10; G01N 21/94; G01N 21/8851
USPC .............. 356/601–623, 3.1, 3.11, 4.01, 5.01; 382/103, 106, 107; 342/146
See application file for complete search history.

(56) References Cited

U.S. PATENT DOCUMENTS

| | | | |
|---|---|---|---|
| 7,920,247 B2 * | 4/2011 | Kitano | G01C 15/002 356/3.1 |
| 9,446,711 B2 * | 9/2016 | Urano | G08G 1/166 |

(Continued)

FOREIGN PATENT DOCUMENTS

JP   2011-186584 A   9/2011

*Primary Examiner* — Hoa Q Pham
(74) *Attorney, Agent, or Firm* — Oliff PLC

(57) ABSTRACT

A method and apparatus for vehicle recognition are provided, which are combined with a radar apparatus scanning a detection area with electromagnetic waves. Data derived from reflection waves are outputted from the radar apparatus to the vehicle recognizing apparatus to detect a vehicle in the detection area. The vehicle recognizing apparatus is provided with a processor performing a process for the recognition on calculation of the received data for the recognition of vehicles. In the process, weak-refection directions providing weak-reflection points on a vehicle are determined which are defined as radiation directions of the electromagnetic waves in which the reflection waves have intensities lower than a threshold. A common reflection point group defined as a group of reflection points belonging to the same vehicle is supplemented with the weak-reflection points for completing the common reflection point group.

17 Claims, 15 Drawing Sheets

(56) References Cited

U.S. PATENT DOCUMENTS

| | | | |
|---|---|---|---|
| 9,702,967 B2* | 7/2017 | Luebbert | G01S 7/354 |
| 9,958,543 B2* | 5/2018 | Schoor | H01Q 21/296 |
| 10,094,786 B2* | 10/2018 | Hasegawa | G01N 21/94 |
| 2009/0237293 A1* | 9/2009 | Sakuma | G01S 5/0072 |
| | | | 342/146 |
| 2012/0008129 A1* | 1/2012 | Lu | G01S 7/4802 |
| | | | 356/5.01 |
| 2017/0242125 A1* | 8/2017 | Suzuki | G01S 17/42 |

* cited by examiner

BACKGROUND PATTERNS OF REFLECTION POINTS

□ : BACKGROUND OBJECT (PATTERN)
▨ : NORMAL REFLECTION DIRECTION
▧ : WEAK-REFLECTION DIRECTION

G2 CONTINUOUS MUTUALLY-ADJACENT REFLECTION DIRECTIONS

FIG.29
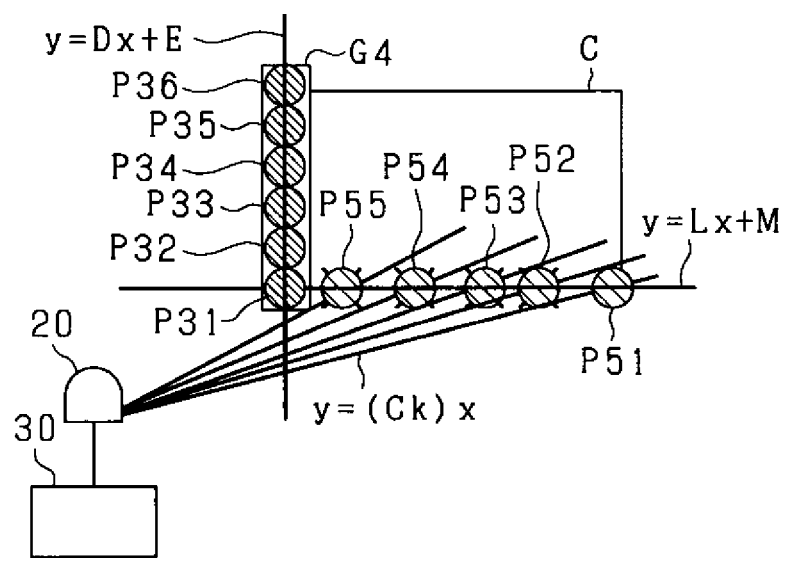
FIG.30
(a)
OBJECT AT N-th FRAME
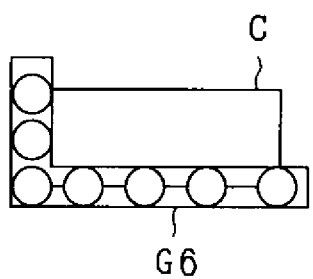
(b)
OBJECT AT "N-1"-th FRAME
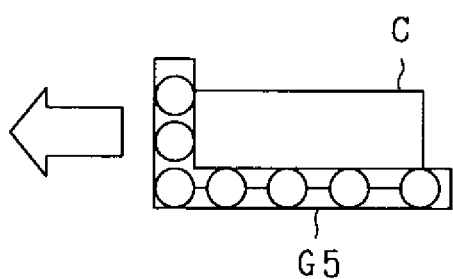

METHOD AND APPARATUS FOR RECOGNIZING VEHICLES USING LASER BEAM SCANNING

CROSS-REFERENCE TO RELATED APPLICATION

This application is based on and claims the benefit of priorities from earlier Japanese Patent Application No. 2017-119081 filed Jun. 16, 2017, the description of which is incorporated herein by reference.

BACKGROUND

Technical Field

The present invention relates to a method and apparatus for recognizing information about vehicles, and in particular, to a method and apparatus for recognizing information about vehicles, based on reflected waves of scanned electromagnetic waves radiated from a radar (radio detection and ranging) system.

Related Art

In recent years, there is known a variety of types of apparatuses configured to recognize presence or other information in relation to objects. For example, an object recognizing apparatus taught by patent publication JP A 2011-186584 is known. In this apparatus, a radar apparatus radiates a laser beam (i.e., electromagnetic waves) to scan a range of 180 degrees ahead of a vehicle. Reflected light (i.e., reflected waves) of the radiated laser beam is thus detected to produce detection patterns of the reflected light, and the produced detection patterns are subjected to matching with feature patterns previous set and held. This matching results in sensing the type of an object from the detection patterns.

However, the object recognizing apparatus provided by the foregoing patent publication JP A 2011-186584 has a drawback, which results from an assumption this apparatus is able to detect the contour of an object with high dimensional accuracy. In other words, this assumption is not always true, because there are some cases in which the reflected waves are not acquired or not sufficient in their intensity. Such cases will occur depending on a reflectance of a part at which a laser beam (laser light) hits, a radiation angle of the laser beam to an object, a distance between the laser system and an object, and/or other factors.

SUMMARY

In view of this drawback, it is thus desired to provide a technique for recognizing or sensing vehicles even if, from a part of a vehicle, there is no sufficient intensity of reflected wave of electromagnetic waves radiated from a radar system.

As an exemplary embodiment according to the disclosure, there is provided an apparatus for recognizing a vehicle, the apparatus being cooperated with a radar apparatus which radiates electromagnetic waves to a detection area at intervals for scanning the detection area, receiving reflection waves at the intervals, and outputting data based on the received reflection waves, the electromagnetic waves having a directivity. The vehicle recognizing apparatus includes: a processor which process the received data by calculation based on a predetermined calculation algorithm previously stored in a memory device. The processor functionally provides via the calculation: a stationary object determining unit determining, based on the reflection waves, a distance from the radar apparatus to a stationary object in all radiation directions of the electromagnetic waves scanned; a reflection point determining unit determining, based on the distances determined in all the radiation directions and the reflation waves in all the radiation directions, positions of reflection points which reflect the electromagnetic waves, the positions being closer to the radar apparatus than the stationary object is; a reflection-point group determining unit determining, of the reflection points determined, a common reflection point group defined as a group of reflection points belonging to a common vehicle; a weak-refection determining unit determining weak-refection directions which are defined as radiation directions of the electromagnetic waves in which the reflection waves have intensities lower than a threshold; a continuous-reflection detection determining unit determining, of the determined weak-reflection directions, one or more continuous reflection directions which are continuous in a scan direction, at the intervals, to the radiation directions of the electromagnetic waves to the common reflection point group; and a point group generating unit, based on an assumption that the vehicle has a rectangular contour in a plane including the all the radiation directions of the electromagnetic waves and the determined common reflection point group, supplementing the common reflection point group with weak-reflection points estimated as belonging to the common vehicle.

As another exemplary embodiment of the disclosure, there is provided a method of recognizing a vehicle, the method being cooperated with a radar apparatus which radiates electromagnetic waves to a detection area at intervals for scanning the detection area, receiving reflection waves at the intervals, and outputting data based on the received reflection waves, the electromagnetic waves having a directivity. The vehicle recognizing method includes processing the received data by calculation based on a predetermined calculation algorithm previously stored in a memory device. The processing provides via the calculation: a stationary object determining step determining, based on the reflection waves, a distance from the radar apparatus to a stationary object in all radiation directions of the electromagnetic waves scanned; a reflection point determining step determining, based on the distances determined in all the radiation directions and the reflation waves in all the radiation directions, positions of reflection points which reflect the electromagnetic waves, the positions being closer to the radar apparatus than the stationary object is; a reflection-point group determining step determining, of the reflection points determined, a common reflection point group defined as a group of reflection points belonging to a common vehicle; a weak-refection determining step determining weak-refection directions which are defined as radiation directions of the electromagnetic waves in which the reflection waves have intensities lower than a threshold; a continuous-reflection detection determining step determining, of the determined weak-reflection directions, one or more continuous reflection directions which are continuous in a scan direction, at the intervals, to the radiation directions of the electromagnetic waves to the common reflection point group; and a point group generating step, based on an assumption that the vehicle has a rectangular contour in a plane including the all the radiation directions of the electromagnetic waves and the determined common reflection point group, supplementing the common reflection point group with weak-reflection points estimated as belonging to the common vehicle.

Preferably, in the foregoing exemplary embodiments, there can further be provided a vehicle recognizing unit or step (30A (S19, S20)) recognizing, at least, as the object being recognized, the common vehicle based on the vehicle point group generated by the point group generating unit.

Various advantageous effects gained from the exemplary embodiments are set forth below together with the accompanying drawings.

BRIEF DESCRIPTION OF THE DRAWINGS

In the accompanying drawings:

FIG. 29 pictorially exemplifies correct reflection point supplement based on weak-reflection points;

FIG. 30 pictorially explains who to track an objet over a plurality of frame data;

DETAILED DESCRIPTION OF THE PREFERRED EMBODIMENTS

Hereinafter an embodiment according to a system for recognizing presence, dimensions or other information (such as vehicle categorized information) of vehicles, called a vehicle recognizing system, will now be described, in which the vehicle recognizing system is installed in an indoor parking lot.

Figure 1:
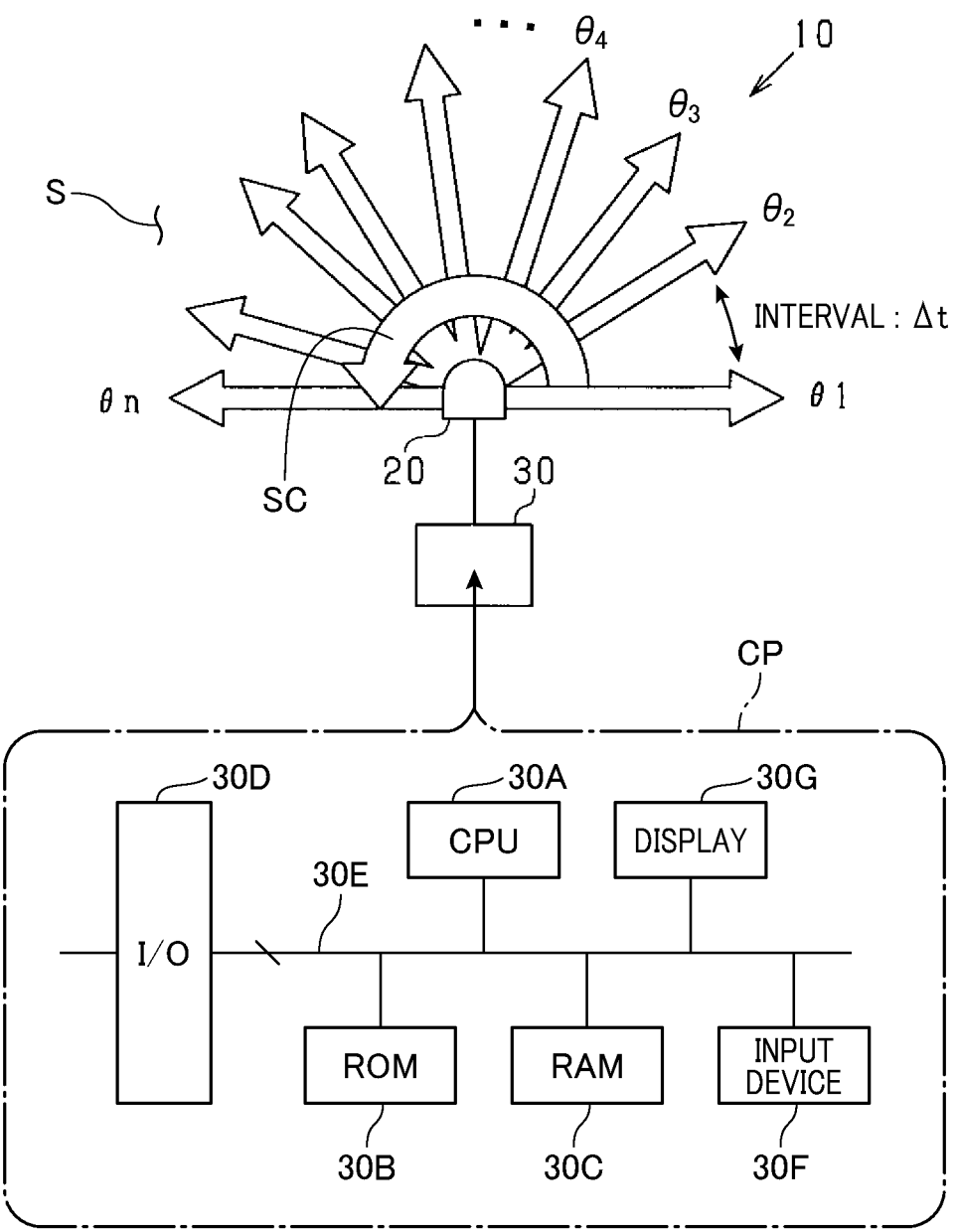
FIG. 1 is an illustration outlining a vehicle recognizing system.

As shown in FIG. 1, the vehicle recognizing system 10 is provided with a radar (radio detecting and ranging) apparatus (or simply a radar) 20 and a vehicle recognizing apparatus 30.

The radar apparatus 20 is provided as a wide-angle range instrumentation radar which radiates, as a beam of light, a laser beam (or simply a laser) so as to scan a frontal detection area of approx. 190 degrees (composed of radiation angles of $\theta_1$ to $\theta_n$) at every predetermined period of time $\Delta t$. Instead of the laser beam, a beam of infrared light, visible light, or ultraviolet light can be used. The radar apparatus 20 is configured to radiate the laser beam around at an angular interval of 0.25 degrees, for instance, which is given as a constant angular interval.

Figure 2:
FIG. 2 is an illustration explaining that there is no reflection object in a detection area.

As illustrated in FIG. 2, the radar apparatus 20 is installed on a wall or a pillar W of the indoor parking lot and scans a desired detection area S (or region) with the laser beam radiated horizontally therearound. The radar apparatus 20 is configured to periodically radiate the laser beam at every predetermined time $\Delta t$ and receives light reflected from objects presented in a forward area of the apparatus, so that the scanning can be performed at a designated frame rate along a scan direction SC (refer to FIG. 1), which is a constant cycle of time ($=\Delta t \times \theta_n$), which is for example few dozens of milliseconds. The radar apparatus 20 then provides signals based on the received reflected light to the vehicle recognizing apparatus 30.

The vehicle recognizing apparatus 30 includes a microcomputer CP (or simply computer) provided with a CPU (central processing unit) 30A, a ROM (read-only memory) 30B, a RAM (random access memory) 30C, and an input/output (I/O) interface 30D. Practically, as illustrated in FIG. 1, the vehicle recognizing apparatus 30 is provided with the configuration of a computer CP, and, in the computer CP, the CPU 30A serving as a processor, the ROM 30B serving as a memory device, and the RAM 30C are communicably connected to the input/output interface 30D via an inner bus 30E. The input/output interface 30D is configured to be able to communicate information, including control signals and detected signals, between the CPU 30A (processor) and externally provided various apparatuses including the radar apparatus 20. In addition, to the bus 30E, an input device 30F and a display 30G are connected as interface means to users.

Vehicle recognizing programs are previously installed in the vehicle recognizing apparatus 30, more practically, in the ROM 30B, which gives software processing to the recognizing apparatus 30. This makes it possible the vehicle recognizing apparatus 30 has various functions later-described. Hence, in the present embodiment, the ROM 30B functions as a recording medium belonging to a category of non-transient computer readable recording mediums. As this recording medium, various kinds of known ROMs can be adopted.

Alternatively, the vehicle recognizing programs can be stored in program recording mediums placed outside the computer CP or the vehicle recognizing apparatus 30. Still alternatively, a part or all of the various functional configurations of the vehicle recognizing apparatus 30 may be realized by adopting digital circuits and/or logic circuits.

The vehicle recognizing apparatus 30 (specifically the CPU 30A) receives light reflected in each of the radiated directions of the laser beam and processes the received reflected light into electrical light-reception signals. Moreover, in the vehicle recognizing apparatus 30, the light-reception electrical signals are used to calculate a distance from the radar apparatus 20 to a reflection point in each of the radiated directions. Reflection points which exist within a given distance range (i.e., a range of given distances) are grouped into a group of reflection-point data, and the group of reflection-point data are stored temporarily.

By using two fames of the stored groups of reflection-point data, for example, by using a one fame data composed of the one group of reflection-point data and the next frame data composed of the group of reflection-point data, both frames data are compared with each other. Through this comparison, the vehicle recognizing apparatus 30 then determines whether or not the two groups of reflection-point data come from the same object which is present in a field which has been scanned by radiation of the laser beam. When it is determined by calculation that the two groups of reflection-point data come from the same object, the reflection-point data are then compared with feature patterns of vehicles (automobiles) previously preserved, resulting in the a vehicle corresponding to the reflection-point data subjected to the feature pattern comparison is recognized (categorized in vehicle types depending on vehicle dimensions, for example).

Figure 3:
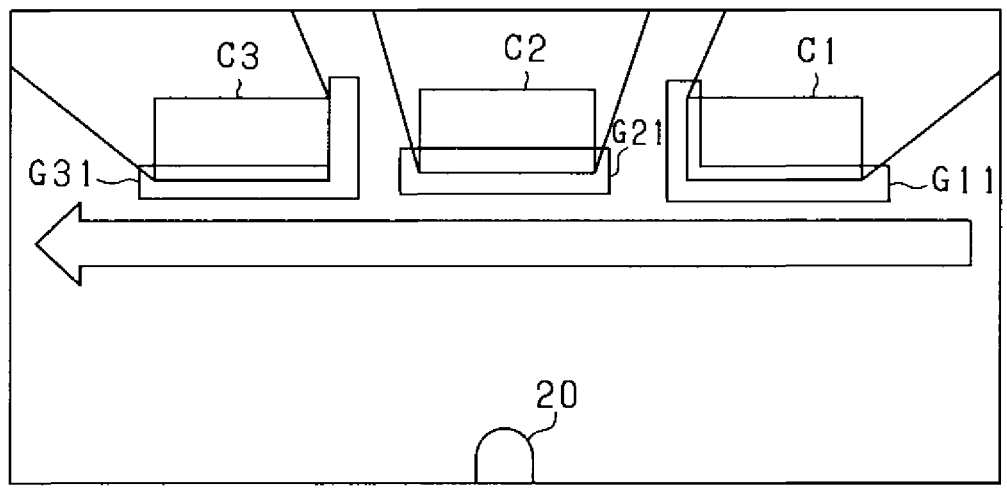
FIG. 3 is an illustration explaining a state in which vehicles are ideally recognized.

FIG. 3 illustrates a plan view showing an ideally recognized state of vehicles C1 to C3. The figure exemplifies a state where the vehicles C1 to C3 move from the right to the left through the detection area. When the laser beam radiated from the radar apparatus 20 is reflected sufficiently in reflection intensity on each portion of each of the vehicles C1 to C3, the vehicle recognizing apparatus 30 can obtained groups of refection-point data G11, G21 and G31. Hence, in the apparatus 30, the groups of reflection-point data G11, G21 and G31 are then subjected to comparison with the previously stored vehicle feature patterns, and the vehicles C1 to C3 are detected (recognized) corresponding to the data G11 to G31, respectively. However, it is frequent that the radiated laser beam is not reflected at a sufficient intensity on parts of the vehicle C1 (to C3). The inventors focused attention on such cases.

Figure 4:
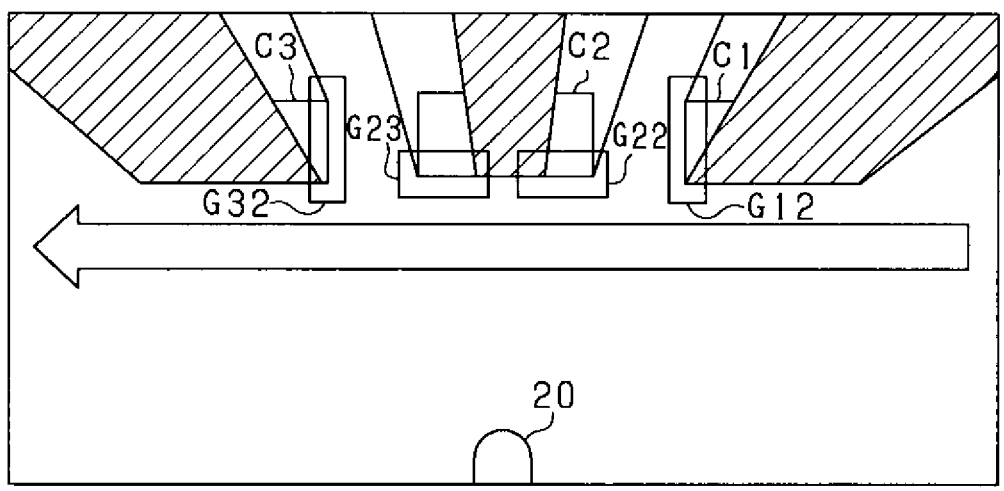
FIG. 4 is an illustration explaining a state in which vehicles are practically recognized.

In contrast, FIG. 4 illustrates a plan view showing a practical recognized state of vehicles C1 to C3 shown in FIG. 3, in which the vehicles C1 to C3 move from the left side to the left side in the drawing. In this drawn case, the laser beam radiated from the radar apparatus 20 hits various portions of the vehicles C1 to C3, but the laser beam may not be returned in sufficient light intensity from a part or all of such portions toward the radar apparatus 20. When such cases are detected, the vehicle recognizing apparatus 30 is configured to obtain groups of refection-point data, G12; G22 and G23; and G32 directed to the vehicles C1, C2 and C3, vehicle by vehicle, respectively. The apparatus 30 is configured to compare these groups of reflection-point data G21; G22 and G23; and G32 with previously stored vehicle feature patterns such that the vehicles indicated by those groups of reflection-point data G12; G22 and G23; and G32 are recognized. In this case, however, although the apparatus 30 has in advance the feature patterns corresponding to the three groups of reflection-point data G11, G21, G31 shown in FIG. 3, the apparatus 30 has no feature patterns corresponding the groups of refection-point data G12; G22 and G23; and G32, resulting in no reconviction of the vehicles C1 to C3.

In the present embodiment, with consideration of such a drawback, the vehicle recognizing system 10 is installed in an indoor parking lot and a detection area used for detecting vehicles C is set around the radar apparatus 20. And it is premised that there is a stationary object(s) in the detection area.

Figure 5:
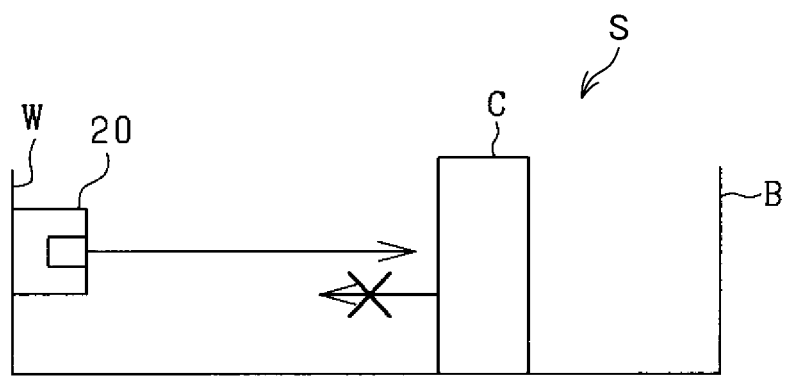
FIG. 5 is an illustration explaining a state in which stationary objects and moving objects are present in the detection area.

FIG. 5 is a pictorial side view showing a stationary object B and an vehicle C are present in a detection area S. If there is no vehicle in the detection area S, the laser beam radiated from the radar apparatus 20 is reflected by the situationally object B such as a wall and/or a pillar. Hence, the apparatus 30 is able to detect distances from the radar apparatus 20 to respective refection points on the stationary object B.

In a case where the vehicle C is present in the detection area S, there are cases where the amount of reflected light (i.e., the light intensity) from a part of the vehicle C becomes lower than expected. Practically, the reflected light may show insufficient intensities depending on, for example, a lower reflection rate of a object portion to which the laser beam has hit, a poor condition of angle of the radiated laser beam to the object, and an excessively longer distance from the radar apparatus 20 to the object. In such a condition is met, the apparatus 30 removes, as noise signals, electrical light-reception signals processed from lesser-intensity reflected light, thus providing no detection of distances to the reflection points. However, in the case of FIG. 5, the precondition that the stationary object B is present around the radar apparatus 20 in the detection area S is set. It is thus possible to suppose that a part of the vehicle C is present in the laser-beam radiated directions in which intensities of the reflected light are lower.

Figure 6:
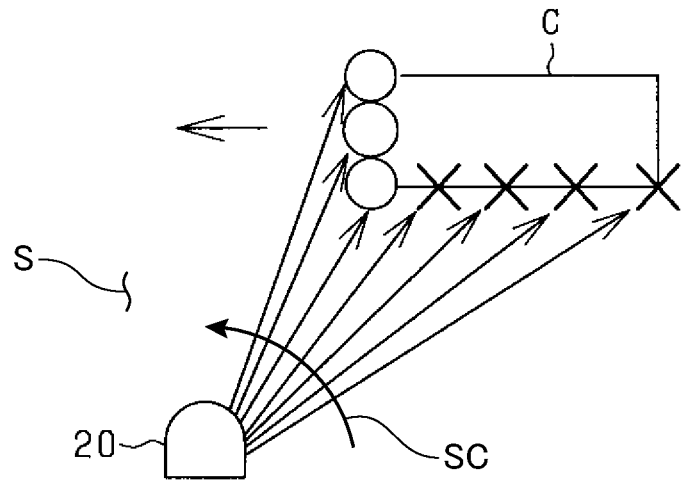
FIG. 6 is an illustration explaining a state in which a part of a vehicle does not reflect a laser beam at a sufficient intensity level.

FIG. 6 is a plan view illustrating a state where a part of the vehicle C does not reflect the laser beam at sufficient intensities. In this case shown, an incident angle (i.e., corresponding to a radiated angle) of the laser beam to a side of the vehicle C becomes smaller, an amount of light reflected from that side of the vehicle C becomes smaller. Portions shown by a circle mark "o" are thus detected as reflection points, while portions shown by a cross mark "x" are not detected as reflection points.

Figure 7:
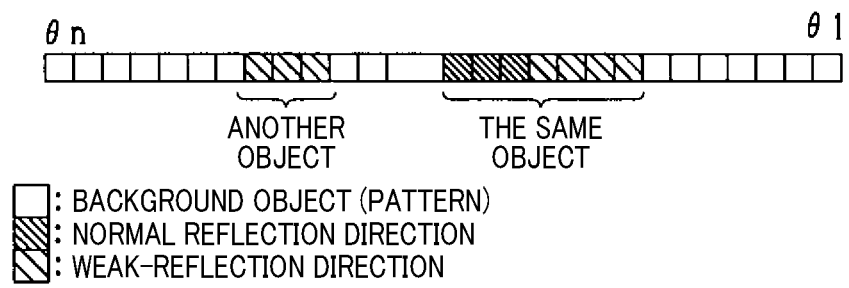
FIG. 7 is an illustration explaining a state in which a relationship between laser beam radiation angles and light reflected states, which is derived from a geometry shown in FIG. 6.

FIG. 7 illustrates a reflection state of the laser beam radiated towards the vehicle C at the radiation angels shown in FIG. 6. In FIG. 7, radiation angles (i.e., radiation directions) indicated by narrow-interval hatches show that distances to reflection points were detected in a normal reflected state so that the normal-reflection directions (simply reflection directions) are provided. In the present embodiment, in the normal reflected state, the reception signal has an intensities higher than a preset threshold (a given value). In contrast, radiation angles indicated by wider-interval hatches show that distances to reflection points were not detected, at least, in the normal reflected state. In the present embodiment, such radiation angles along which the distances were not detected are referred to as weak-reflection directions.

Depending on materials of respective parts of the vehicle C, radiation angles of the laser beams to the respective parts and/or distances from the radar apparatus to respective parts, the vehicle C has parts which reflects the laser beam toward the radar apparatus at normal light levels and parts which reflects the laser beam toward the radar apparatus at weaker light levels. Hence, the same vehicle C provides both the normal-reflection directions shown by the narrow-interval hatches and the weak-reflection directions shown by the wider-interval hatches. In addition, on the same vehicle C, both the normal-reflection directions and the weak-reflection directions are present continuously in the scan direction SC. In consequence, when such continuous presence of the normal- and weak-reflection directions are detected, it can be supposed that the parts providing both the normal- and weak-reflection directions continuously in the scan direction SC are present on the same vehicle C (i.e., the same object). If, however, this continuous presence of the normal- and weak-reflection directions are detected is not detected, it is supposed that the parts providing both the normal- and weak-reflection directions continuously belong to mutually different objects, that is, the vehicle C and another object in FIGS. 6 and 7.

Figure 8:
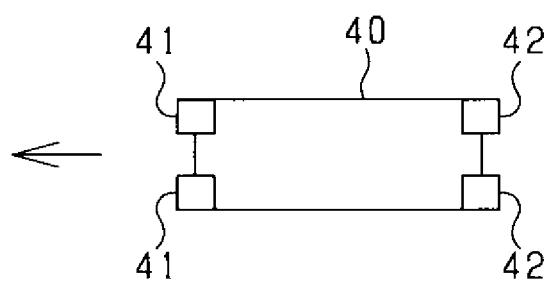
FIG. 8 is a plan view pictorially showing a vehicle.

FIG. 8 is a plan view illustrating a vehicle 40 provided with headlights 41 on the front thereof. The headlights 41 have light collectors to collect light from a light source and radiate the collected light. The collectors are configured to have a higher reflection rate to the laser beam. On the rear of the vehicle 40, reflector plates 42 are provided, which are also configured to have a higher reflection rate to the laser beam. Hence, the vehicle recognizing system 10 is able to detect both the headlights 41 and the reflector plates 42 of the vehicle 40 with higher accuracy.

On the other hand, tires (not shown in the figures) and a vehicle body are exposed on a side of the vehicle 40. Usually, these parts, i.e., the tires and body, have not a higher reflection rate. If a distance between these parts and the radar apparatus 20 is longer or the radiation angles of the laser beam to the these parts are smaller, i.e., smaller acute angles, reflection points disappear more easily on these parts.

Figure 9:
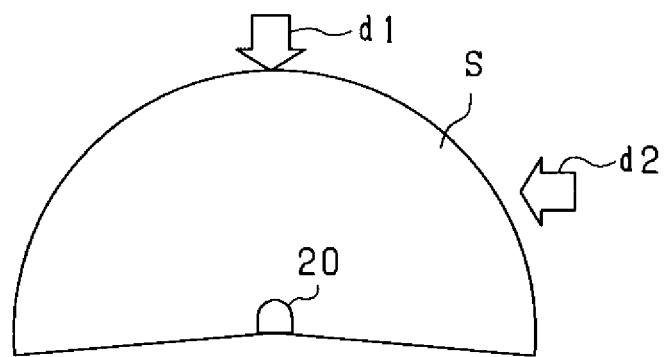
FIG. 9 is an illustration exemplifying a vehicle which runs toward the detection area provided by the radar apparatus.

FIG. 9 pictorially exemplifies a relationship between the detection area S of the radar apparatus 20 and the approach direction of a vehicle. It is usual that the approach direction and parking lots for vehicles are decided depending on where the vehicles run, so that an approach direction of vehicles in the detection area S is decided beforehand. For instance, a vehicle approaches to the front of the radar apparatus 20 from outside the detection area S as shown by an arrow d1. In another case, a vehicle approaches, as shown by an arrow d2, to the detection area S along a direction from the right side of the radar apparatus 20 to the left side thereof. It is therefore possible to develop detected modes of respective parts of a vehicle into patterns based on the reflection rates of the respective parts of the vehicle and the approach direction of the vehicle.

Figure 10:
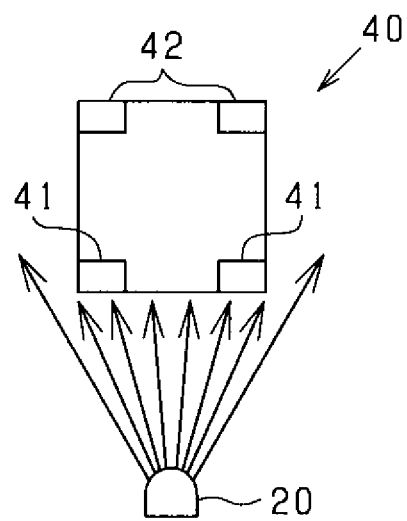
FIG. 10 is an illustration explaining a state in which the laser beam is radiated to the front part of a vehicle which runs directly toward the radar apparatus.

FIG. 10 shows a state where a vehicle approaches directly to the radar apparatus 20 at an almost right angle via the detection area S such that the laser beam is radiated to the front of the approaching vehicle 40. During a state a distance between the radar apparatus 20 and the vehicle 40 is over a predetermined distance (i.e., a threshold), only parts composing the headlights 41 are detected as reflection points at each of which the laser beam is reflected, but an intermediate portion between the headlights 41 is not detected as a reflection point of the laser beam.

Figure 11:
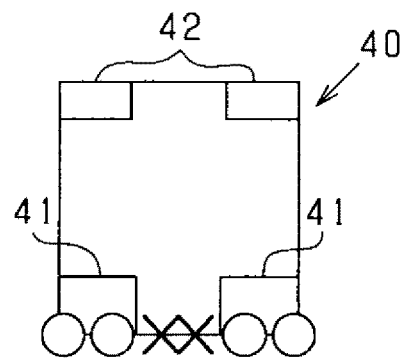
FIG. 11 is an illustration exemplifying a state in which how the front part of the vehicle shown in FIG. 10 is detected by the laser beam.

FIG. 11 shows the detected reflection points of the front parts of the vehicle shown in FIG. 10. As can be understood, the parts composing the headlights 41, which are marked by a circle ("o" mark), act as normal-reflection points for the laser beam, but the intermediate portion between the headlights 41 acts weak-reflection points for the laser beam, which are marked by a cross mark "x". By contrast, when the distance between the radar apparatus 20 to the vehicle becomes smaller than the predetermined distance, the intermediate portion between the headlights 41 also presents normal-reflection points for the laser beam.

Figure 12:
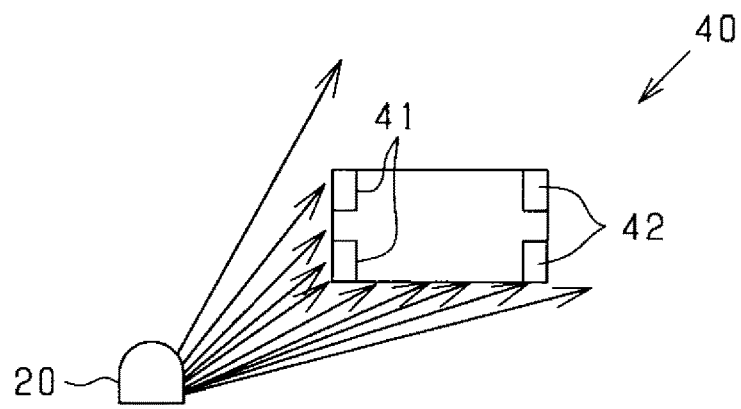
FIG. 12 is an illustration exemplifying a state in which the laser beam is radiated to a side of a vehicle which runs laterally in the detection area.

FIG. 12 pictorially shows a state where the laser beam is radiated to a vehicle which is approaching to the radar apparatus 20 along a lateral path from one side of the other side. In this case, the vehicle 40 comes into the detection area S, during which the radiation path of the laser beam between the radar apparatus 20 and the vehicle 40 become larger from acute angles (i.e., smaller angles) in the beginning to angles which approaches the right angle. Accordingly, in a period of time during which the distance from the radar apparatus 20 to the vehicle 40 is sill longer than a first predetermined distance (i.e., a first distance threshold), a side surface of the vehicle, which faces the radar apparatus 20, will not be detected as refection points for the laser beam.

Figure 13:
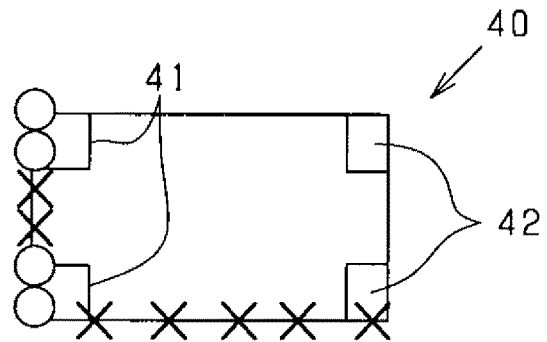
FIG. 13 is an illustration exemplifying a state in which how the side part of the vehicle shown in FIG. 12 is detected by the laser beam.

FIG. 13 pictorially shows the reflection points on the vehicle 40 which runs as shown in FIG. 12, in which the parts composing the headlights 41 act as the normal-reflection points marked by the circle ("o" mark), while the intermediate portion between the headlights 41 and the side surface of the vehicle 40 provide the weak-reflection points marked by the cross ("x" mark).

In a case where the distance between the radar apparatus 20 and the vehicle 40 is smaller than the first predetermined first distance and a larger than a second predetermined distance (i.e., a second distance threshed) which is set to be smaller than the first predetermined distance (the first distance threshold), only parts corresponding to the tire wheels in the side surface of the vehicle 40, that is, only almost longitudinal end portions of the vehicle), act as the reflection points.

If the distance between the radar apparatus 20 and the vehicle 40 is less than the second predetermined distance, the whole area of the side of the vehicle 40 provides the refection points thereon.

In the present embodiment, the vehicle recognizing apparatus 30 generates a group of reflection-point data using the electrical light-reception signals obtained at the reflection points. And the apparatus 30 uses data resulting from the weak-reflection points, so as to supplement the group of refection-point data, which completes production of the group of reflection-point data directed to the vehicle 40. This group of reflection-point data, whose data resulting from the weak-reflection points are supplemented (or compensated), are then subjected to a process for recognizing whether or not the vehicle 40 is present.

Figure 14:
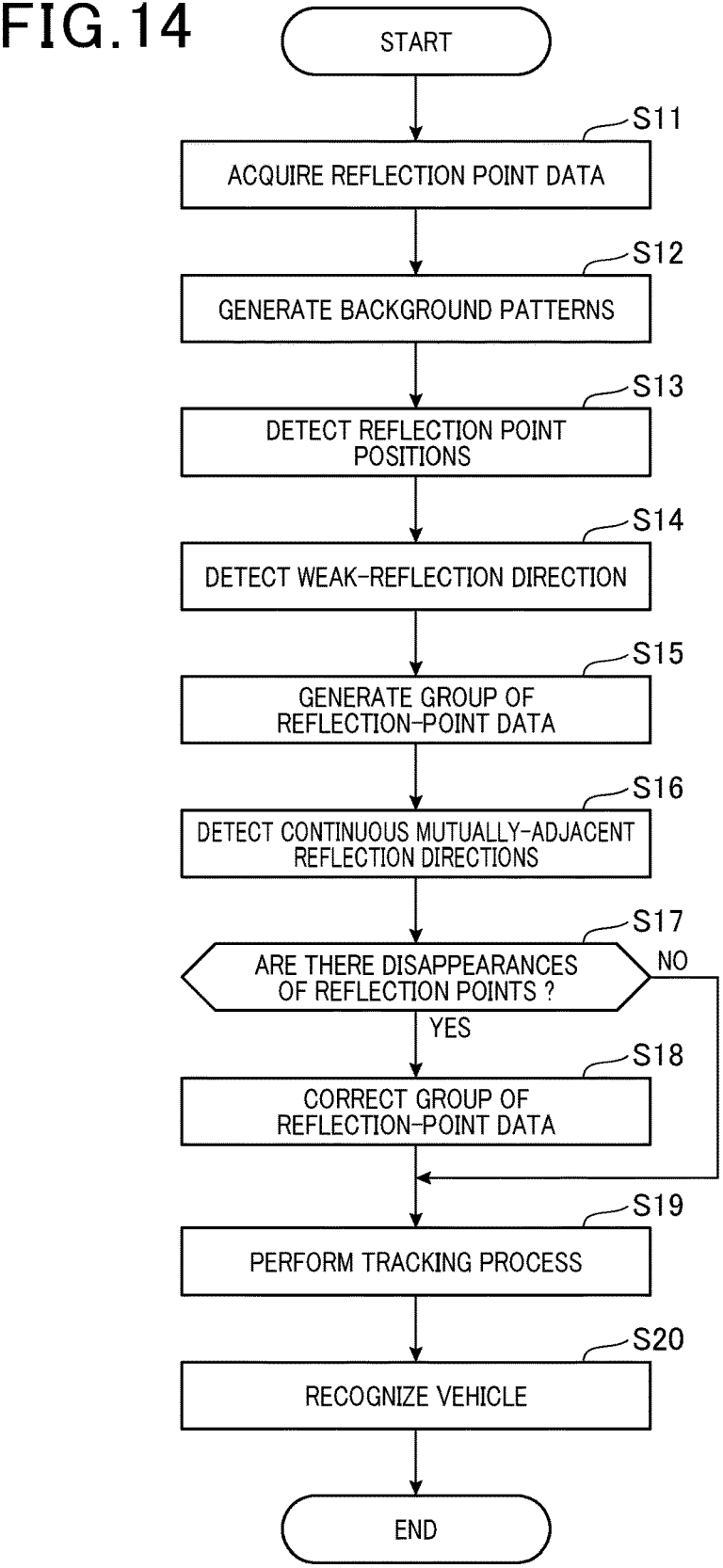
FIG. 14 is a flowchart showing steps of a vehicle recognizing process.

FIG. 14 shows how to perform a vehicle recognizing process, which is carried out by the vehicle recognizing apparatus 30 (practically, by the CPU 30A).

First, the apparatus 30 acquires data at reflection points (i.e., measurement points) from the radar apparatus 20 (step S11 in FIG. 14).

Figure 15:
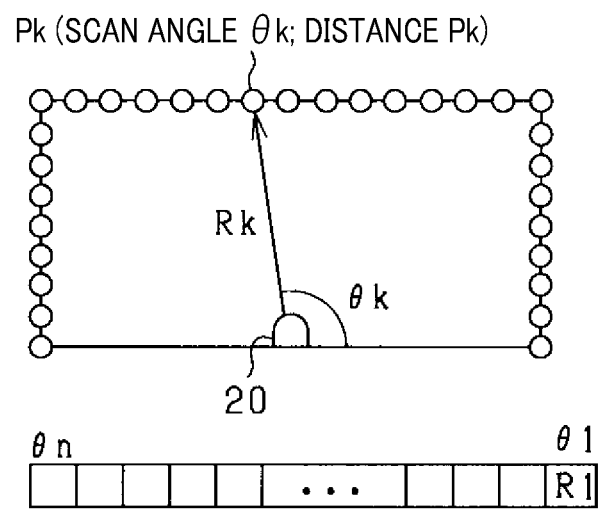
FIG. 15 is an illustration exemplifying a relationship between radiation angles of the laser beam and distances to a stationary object.

Specifically, as shown in FIG. 15, using electrical light-reception signals of reflected light at respective radiation angles $\theta_1$ to $\theta_n$ (i.e., respective radiation directions), a distance $R_k$ from the radar apparatus 20 to each reflection point $P_k$ (k=1 to n: n is a positive integer larger of 1 or more) at each of the radiation angles $\theta_k$. That is, based on a propagation time of reflected light, a distance from the radar apparatus 20 to a stationary object is obtained in each of all the radiation directions of the laser beam scanned over the detection area S.

Figure 16:
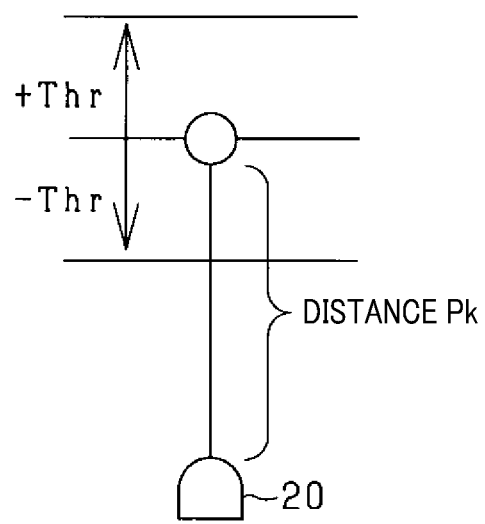
FIG. 16 shows how the stationary object is detected based on a distance comparison.
Figure 17:
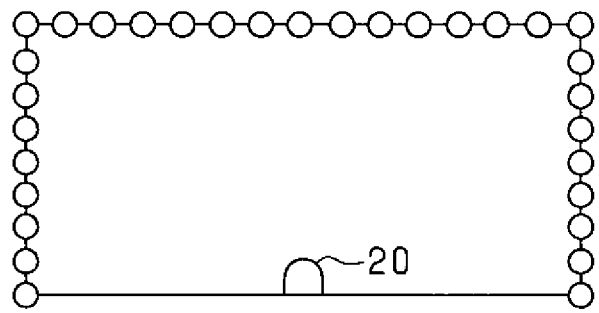
FIG. 17 is an illustration exemplifying a background pattern of reflection points.

Then, by the vehicle recognizing apparatus 30, a background pattern is generated, which is composed of a pattern of stationary objects in the detection area S (step S12). Concretely, as shown in FIG. 16, it is determined whether or not the obtained distance $P_k$ is within a designated variation margin ($\pm T_{hr}$) during a predetermined period of time in each of the radiation angles $\theta_k$. If this determination is affirmative, a refection point in a direction along a current radiation angle $\theta_k$ belongs to a stationary object now interested. As shown in FIG. 17, the reflection points all belonging to the stationary object are then collected to be produced into a background pattern composed of reflection points on the stationary object.

Figure 18:
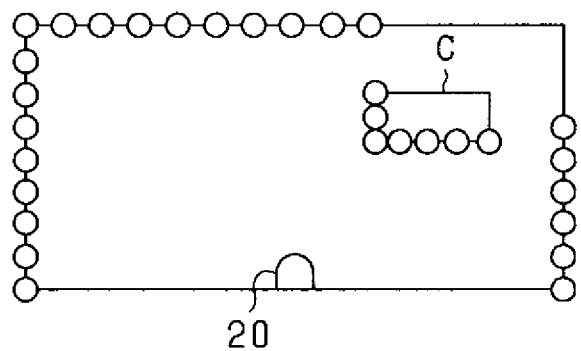
FIG. 18 is an illustration exemplifying reflection points of both a stationary object and a moving object.
Figure 19:
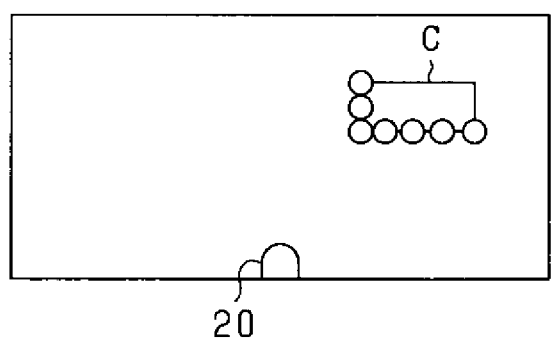
FIG. 19 is an illustration exemplifying extracted reflection points of the moving object.

By the vehicle recognizing apparatus 30, the positions of refection points on a moving object are then detected (step S13). Specifically, as shown in FIG. 18, it is first determined whether or not, at each of the radiation angle $\theta_k$, a difference between the distances is larger than a predetermined threshed. In this determination, the difference is calculated by subtracting, from the distance to the background pattern (i.e., the stationary object), a distance to the reflection point. If such a condition is met in this determination, it is decided that the reflection point currently calculated is positioned on the moving object C. As shown in FIG. 19, only the refection points on the moving object C can thus be extracted and detected in their directions. Practically, based on a distance to the stationary object and a reflected light intensity in each of all of the detected radiation directions of the laser beam, a reflection point is specified as a position i) at which the laser beam is reflected and ii) which is closer to the radar apparatus 20 than the stationary object is.

Then, by the vehicle recognizing apparatus 30, a weak-refection direction is detected, which is a radiation direction of the laser beam in which a reflection point is not detected (step S14). Specifically, when the electrical light-reception signal of reflected light (i.e., an intensity of reflected light) is less than a threshold, the laser-beam radiation direction that shows such a lower intensity reflection is determined as a weak-reflection direction. It can be understood that a laser-beam radiation direction to the foregoing weak-reflection point corresponds to the weak-reflection direction.

Figure 20:
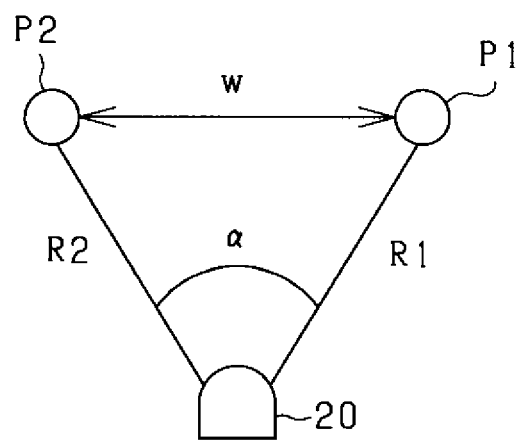
FIG. 20 explains how a grouping process is performed.

Of the detected reflection points in all the radiation directions, reflection points which are present within a designated distance range are grouped as a group of reflection-point data in the apparatus 30 (step S15). Practically, as shown in FIG. 20, when being assumed such that a distance w is provided between two reflection points P1 and P2, distances R1 and R2 each are provided between the radar apparatus 20 to a corresponding one of the two reflection points P1 and P2, and an angle α is provided between the laser-beam radiation directions to the reflection points P1 and P2, the following formula is met:

$$w^2 = R1^2 + R2^2 - 2 \cdot R1 \cdot R2 \cdot \cos \alpha$$

This formula is used to calculate the distance w, and the calculated distance w is subjected to a grouping process such that reflection points which provide a distance w shorter than a preset distance (threshold) are classified as the same group. In other words, from the detected reflection points, a group of reflection points belonging to the same vehicle is produced as a common reflection-point group.

Figure 21:
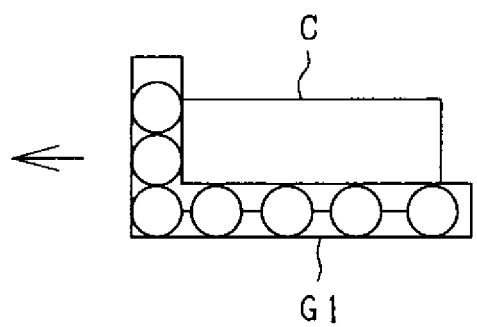
FIG. 21 is an illustration exemplifying a group of reflection-point data.

FIG. 21 pictorially exemplifies a group of reflection-point data having no disappearance of measurement points (i.e., reflection points) on the vehicle C. In this example, as shown, a group of reflection-point data G1 is produced to cover the front and a side of the vehicle C.

Figure 22:
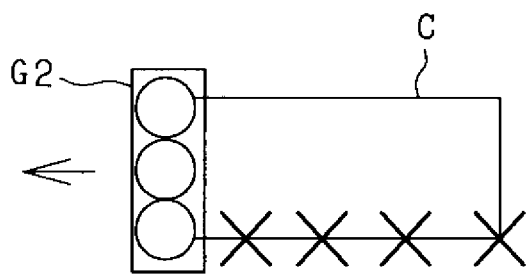
FIG. 22 is an illustration exemplifying another group of reflection-point data.

FIG. 22 pictorially exemplifies a group of reflection-point data having disappearance of measurement points (i.e., reflection points) on the vehicle C. In this example, a group of reflection-point data G2 is produced to cover the refection points of only the front of the vehicle C, whilst there are no reflection points on a side of the vehicle C. That is, the laser-beam radiation directions toward the side of the vehicle C correspond to the weak-reflection directions.

Of the detected weak-reflection directions, refection directions which are continuous in the scan direction SC (, in which, however, the predetermined period of time Δt is placed between mutually adjacent two radiation directions of the laser beam providing the produced group of reflection-point data,) are defined as continuous reflection directions, and these continuous reflection directions are determined and subjected to a correspondence process (step S16).

Specifically, in the reflection points shown in FIG. 21, there are no weak-reflection directions, whereby the continuous reflection directions do not exist. Meanwhile, in the reflection points shown in FIG. 22, it can be understood that there are continuous reflection directions, because the laser-beam radiation directions to the weak-reflection points shown by a cross mark are continuous from the group of reflection-point data G2. Then the continuous reflection directions are made to correspond to the group of reflection-point data, while weak-reflection directions which are not the continuous reflection directions are not subjected to the correspondence process. Additionally, in a case where there are two groups of reflection-point data with the continuous reflection directions (in other words, on both ends of the continuous reflection directions, a group of reflection-point data is present, respectively), those two groups of reflection-point data are combined into a single group of reflection-point data.

Figure 23:
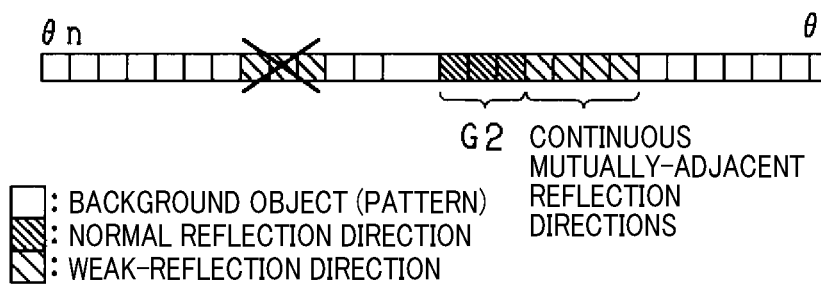
FIG. 23 pictorially shows a relationship among laser-beam radiation directions and a group of reflection-point data including data acquired in continuous refection directions which pass weak-reflection points on an object.

FIG. 23 exemplifies a relationship of the laser-beam radiation directions, the group of reflection-point data G2, and the continuous reflection directions. As illustrated, there are two groups of weak-reflection directions, one of which group is not continuous from the group of reflection-point data G2 acquired at normal-reflection points and the other of which is continuous from the group of reflection-point data G2. The non-continuous group of weak-reflection directions are thus not subjected to the process for making correspondence (combination) to the group of reflection-point data G2 (refer to a cross mark in FIG. 23). That is, the non-continuous group of weak-reflection directions are removed from the correspondence process. In contrast, the continuous group of weak-reflection directions, that is, the continuous reflection directions, are thus subjected to the process for making correspondence (combination) to the group of reflection-point data G2.

Then, in the apparatus 30, it is determined whether or not disappearance of measurement points are made to correspond to (i.e., be combined with) the group of reflection-point data (step S17). Practically, it is determined whether or not the foregoing contiguous reflection directions are made to correspond to (i.e., be combined with) the group of reflection-point data acquired at normal-reflection points. If this determination reveals such a correspondence (i.e., combination) (YES at step S17), the group of reflection-point data are corrected as shown in the following (step S18).

Figure 24:
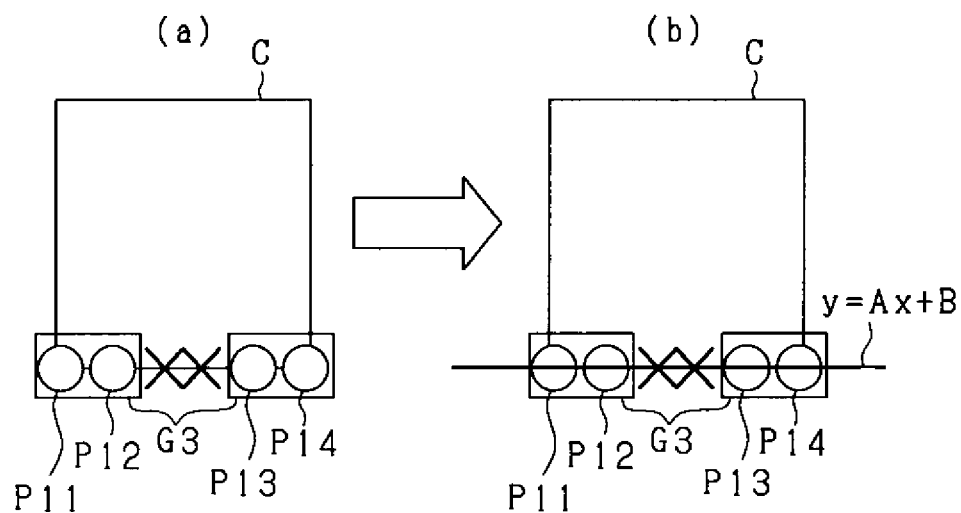
FIG. 24 shows, in its (a) and (b), how to calculate a first approximation linear line.

The correction will now be explained. As shown in (a) of FIG. 24, it is assumed as an example that a group of reflection-point data G3 acquired at the normal-reflection points includes data from the reflection points P11 to P14 and a pattern of continuous reflection directions (i.e. weak-reflection direction) are provided as shown by cross marks between the laser-beam radiation directions to two reflection points P12 and P13. In the present embodiment, the vehicle recognizing apparatus 30 assumes that an object being detected by the radar apparatus 20 is a vehicle. Hence, the apparatus 30 assumes that a contour of the object being detected is a rectangle as shown in (b) of FIG. 24 in a memory plane (hereinafter referred to as a radiation plane) virtually including all the radiation directions of the laser beam. In this pattern, as illustrated in (b) of FIG. 24, a first approximation linear line is calculated. This first approximation linear line is expressed by a linear line y=Ax+B, where the expressed linear line includes a front side (or may be another side) of the rectangle modeling the vehicle and the reflection points P11 to P14 are present on the linear line expressed by the formula. By way of example, coefficients A and B are calculated using a least-square approach such that the first approximation linear line y=Ax+B passes most closely to the reflection points P11 to P14.

Figure 25:
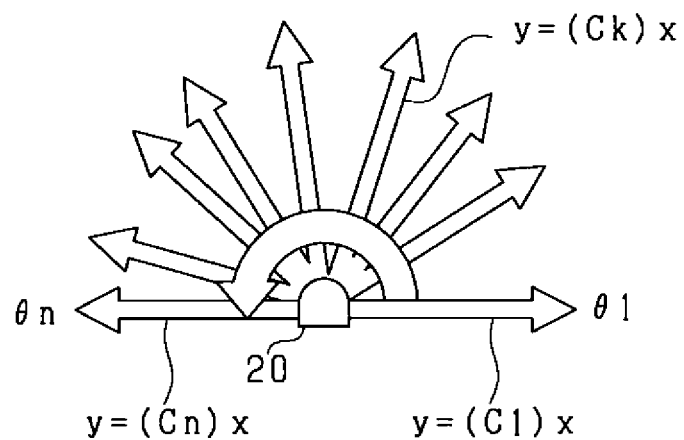
FIG. 25 shows respective laser-beam radiation directions.

As shown in FIG. 25, when the radar apparatus 20 is positionally set to be the origin of a two-dimensional coordinate, the respective radiation directions of the laser beam can be expressed by linear lines defined by y=(C1)x, y=(C2)x, ..., y=(Ck)x, ..., y=(Cn)x, as a general form, in which Ck expresses the radiation directions. It is thus possible to designate, as weak-reflection points P21 and P22, respective intersections made between the first approximation linear line y=Ax+B and two continuous reflection directions expressed by y=(Ck)x and y=(Ck+1)x. Using such intersection positions, new weak-reflection points P21 and P22 are added to the group of reflection-point data G3 acquired at the normal-reception points. That is, the group of reflection-point data G3 is supplemented by reflection-point data calculated from both adjacent reflection-point data acquired at normal-reception points, with the result that a space between the normal-reflection points P12 and P13 is supplemented with addition of the new weak-reflection points P21 and P22. The group of reflection-point data G3 supplemented with the weak-reflection points P21 and P22 serves as a group of vehicle points all indicating and belonging to the same vehicle.

Figure 27:
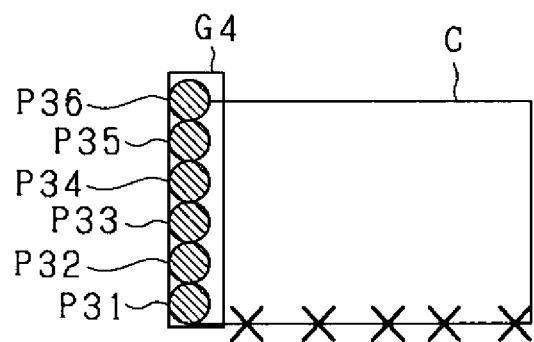
FIG. 27 pictorially shows a mixed state where a group of reflection-point data acquired at normal-reflection points on an object and weak-reflection points on the object.
Figure 28:
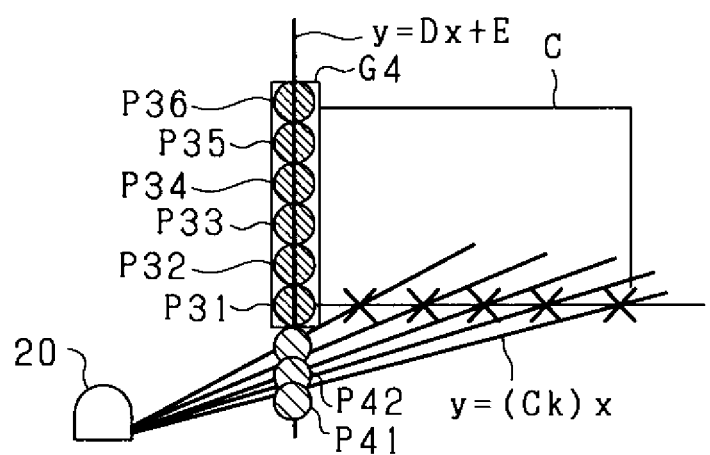
FIG. 28 pictorially exemplifies erroneous reflection point supplement based on weak-reflection points.

In addition, as shown in FIG. 27, there is a pattern in which data at normal-reflection points P31 to P36 are composed of a group of reflection-point data G4 and the lase-beam radiation directions for the group of reflection-point data G4 are continuous from only one side of continuous reflection directions (i.e., weak-reflection directions: shown by cross marks) in the scan direction. It is assumed, described above, the object being detected has a rectangular shape in the radiation plane. And, as illustrated in FIG. 28, a second approximation linear line is calculated in the apparatus 30 in such a manner that the reflection points P31 to P36 are on a linear line y=Dx+E including a side showing the front of the vehicle C modeled in the rectangle. When intersections made between the second approximation linear line y=Dx+E and a linear lines y=(Ck)x indicating the continuous reflection directions correspond to weak-reflection points, there can be provided weak-reflection points P41, P42, etc. which are located differently from the contour of the vehicle C.

In cases where, as shown in FIG. 27, the front or the rear of a vehicle C is detected at normal reflection levels and laser-beam radiation directions to a group of reflection-point data are continuous from only one side of continuous reflection directions in the scan direction, it is highly probable that the continuous reflection directions are originated from a side of the vehicle. Hence, in this case, in the foregoing second approximation linear line y=Dx+E, it is reasonably estimated that the weak-reflection points do not exist in the outsides of the reflection points P31 to P36 in a direction along the second approximation linear line. It is also reasonable in such a case that, if a side portion of the vehicle C presents weak-reflection points, such weak-reflection points are expressed on a linear line perpendicular to the second approximation linear line y=Dx+E.

With consideration of such reasonable assumptions, as shown in FIG. 29, the patterning process in the apparatus 30 proceeds with calculation of another linear line y=Lx+M which is perpendicular to the second approximation linear line y=Dx+E and passes the one reflection point P31. This refection points P31 is adjacent to a staring reflection point from which the series of continuous reflection directions starts as shown by cross marks. Then an intersection between the linear line y=Lx+M and each of various linear lines y=(Ck)x, y(Ck+1)x, etc. is calculated as each of weak-reflection points P51 to P55. Then the weak-reflection points P51 to P55 are added to the group of reflection-point data G4, as shown in FIG. 29, for supplementing the data group G4. This supplemented group of reflection-point data G4 is thus provided as a group of vehicle points indicating the surface points belonging to the same vehicle.

Incidentally, in the foregoing formulas expressing linear lines, the reference symbols y and x expresses positions in y- and x-axes and the reference symbols A, B, L, M, D and E expresses constants calculated for determining the intersections.

Then, in the apparatus 30, the supplemented group of reflection-point data are stored temporally in the memory fora plurality of frames. The supplemented group of reflection-point data for the plurality of frames are read proper timing and used to be subjected to a tracking process (step S19). To be specific, as shown in FIG. 30, the "N−1-th" frame data composed of a supplemented group of reflection-point data G5 and the N-th frame data a supplemented group of reflection-point data G6 are compared with each other using a subtraction method, for instance. It is thus able to determine the data G5 and G6 are originated from the same object (the same tracking object) when a degree of similarity is higher than a given value. In contrast, the degree of similarity is lower or equal than or to the given value, it is determined that the data G5 and G6 are originated from mutually different objects (i.e., not the same object).

Figure 31:
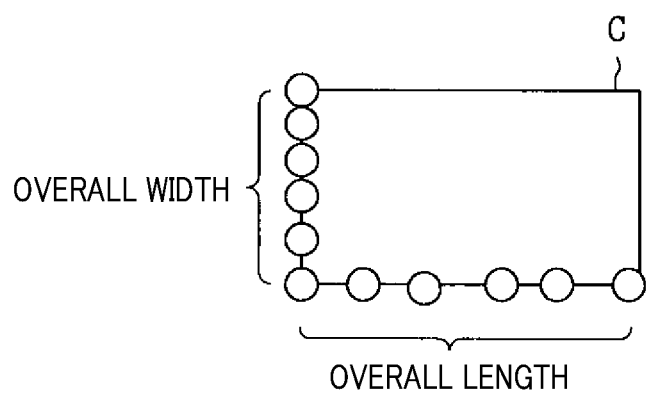
FIG. 31 exemplifies a mode showing how to recognize a vehicle.

In the apparatus 30, the supplemented group of reflection-point data determined to be from the same object is used to recognize a vehicle (step S20). Specifically, the supplemented group of reflection-point data is compered with feature patterns of the vehicles which are previously stored in the memory device of the apparatus 30. In a case where a degree of similarity of both patterns is higher than a given determination value in the comparison step, it is recognized that the object providing the supplemented group of reflection-point data is a vehicle having a specific feature pattern selected from the stored feature patterns. Incidentally, as shown in FIG. 31, based on the positions of reflection points or such reflection points supplemented with weak-reflection points, the whole length and whole width of the vehicle can be calculated. The calculated whole length and width can also be used to classify the recognized vehicles into various desired categories, as recognized information.

In the foregoing processing carried out by the vehicle recognizing apparatus 30, the process at step S11 corresponds to stationary object determining means (or unit, or step), the processes at step S12 and S13 correspond to reflection point determining means (or unit, or step), and the process at step S14 corresponds to weak-refection determining means (or unit, or step). The processes at steps S15 and S16 function as reflection-point group determining means (or unit, or step). Further, the process at step S16 corresponds to determining means of continuous reflection detections (or unit, or step). The processes at steps S17 and S18 configure point group generating means (or unit, or step), and the process at steps S19 and S20 configures a vehicle recognizing means (or unit, or step).

The foregoing embodiment is thus able to provide the following various advantages.

It is possible to determine weak-reflection directions, which are laser-beam radiation directions in which intensities of reflected light are less than a predetermined threshold. Distances from the radar apparatus 20 to one or more stationary objects are decided in all the laser-beam radiation directions. Accordingly, it is thus possible to predict presence of a moving object in laser-beam radiation directions including directions in which the reflected light intensities are less than the given threshold. In addition, it can be supposed that portions on a vehicle C which did not reflected the leaser beam at sufficient levels are positionally continuous (with intervals due to the scanning) from positions providing a group of reflection-point data detected at normal reflection levels. Hence, among the determined weak-refection directions, continuous reflection directions can be determined (detected) which are defined as directions continuous to directions of such group of normally detected refection-point data in the laser-beam radiation directions, i.e., the scan direction.

In this vehicle recognizing apparatus 30, it is premised that objects being detected by the radar apparatus 20 are vehicles C. For this reason, it can be supposed that the objects have a rectangular (including square) contour in a plane (radiation plane) including all the laser-beam radiation directions. Hence, based on both the above premise and the determined group of reflection-point data, weak-reflection points estimated as points belonging in common to the same vehicle in the determined continuous reflection directions are supplemented or added to the group of reflection-point data. This supplement of the weak-reflection points thus provides a supplemented or completed group of reflection-point data assigned, as a vehicle point group, to the same vehicle C. Accordingly, even if one or more parts of one vehicle do not sufficient intensity levels higher than a preset threshold, the vehicle recognizing apparatus is able to recognize, at least, present of the vehicle C based on the supplemented group of refection-point data.

In the present embodiment, it is premised that the vehicle C has rectangular contour in the laser-beam radiation plane. Hence, if one ore reflection points disappear in the reflection points included in the group of refection-point data, it can be estimated that there are weak-reflection points at the disappeared points. In this regards, the vehicle recognizing apparatus 30 first determines whether or not one or more continuous reflection directions are present in the laser-beam radiation directions to the reflection points in a group of reflection-point data. If it is determined that such weak-reflection points are present, the apparatus 30 then supplements the group of the reflection-point data with the weak-reflection points, such that the weak-reflection points are added between two reflection points which are next to both sides of the continuous reflection directions in the scan direction SC. That is, the weak-reflection points are added to the group of the reflection-point data for compensation for the disappeared reflection points. It is therefore possible that there are light weak-refection portions on a vehicle, weak-reflection points indicating such light weak-refection portions are supplemented or added partly to the group of reflection-point data, thereby generating the group of full reflection-point data directed to the same vehicle.

In the present embodiment, the respective laser-beam radiation directions can be expressed by a linear line $y=(Ck)x$ as described, which passes the position at which the radar apparatus 20 is present. For this reason, it can be estimated that the weak-reflection points are present at intersections made by a first approximation linear line $y=Ax+B$ and the foregoing linear line $y=(Ck)x$ expressing the continuous reflection directions among the weak-reflection directions. The first approximation linear line $y=Ax+B$ indicates, as described, a side of the rectangular contour of the vehicle C (precisely, the wide from which one or more reflection points have disappeared). With considering this geometry, in the vehicle recognizing apparatus 30, it is first determined or estimated whether or not there are continuous reflection directions among the laser-beam radiation directions to the reflection points included in the group of the reflection-point data. When this determination reveals presence of such continuous reflection directions, the first approximation linear line $y=Ax+B$ and the linear line $y=(Ck)x$ are set to add the weak-reflection points at the intersections made between the both linear lines, whereby the group of refection-pint data are supplemented with the weak-reflection points.

In the present embodiment, the vehicle C can be exemplified as an automobile with headlights on the front surface and reflectors on the rear surface. In general, these portions can reflect the incident laser beam at sufficiently higher intensities, resulting in that the front and the rear of the vehicle can usually be estimated as reflection points normally detected without failure. Therefore, in cases where the front or rear of a vehicle is detected and the laser-beam radiation directions to the group of reflection-point data G4 is continuous, with a predetermined interval, to only one side of the continuous reflection directions in the scan direction, it is highly possible that such continuous reflection directions are oriented to a side of the automobile. Accordingly, when it is estimated that a side of the automobile provides such weak-reflection points, the foregoing second approximation linear line $y=Dx+E$ and the linear line $y=(Ck)x$ are used in the apparatus 30. Practically, intersections are obtained at each of which i) a linear line $y=Lx+M$ being perpendicular to the second approximation linear line $y=Dx+E$ and passing a reflection point P31 determined as a radiation direction located next to the continuous refection directions in the scan direction SC and ii) the linear line $y=(Ck)x$ expressing each of the respective continuous refection directions. It is thus estimated that the one or more weak-reflection points P51 to P55 exist at the one or more intersections obtained.

That is, there is a case where no continuous reflection directions exist in any two of the laser-beam radiation directions to the reflection points P31 to P36 included in the group of reflection-point data G4, but the laser-beam radiation directions to the group of the reflection-point data G4 are continuous, with a predetermined interval, from only one side of the continuous reflection directions in the scan direction SC. Even in such a case, the reflection points P51 to P55 which are present on weak reflection portions of the automobile are added to complete the supplemented group of reflection-point data G4.

In this way, the supplemented (or compensated) group of reflection-point data can be obtained and, with use of this data, a vehicle C is recognized in its dimensions or other information. Even when the laser beam radiated from the radar apparatus 20 has not been reflected at sufficient high intensities on a part of the vehicle C, the vehicle recognizing apparatus 30 is able to recognize the vehicle reliably.

As modifications, the vehicle recognizing apparatus 30 according to the present embodiment can be developed into various other modes.

Figure 26:
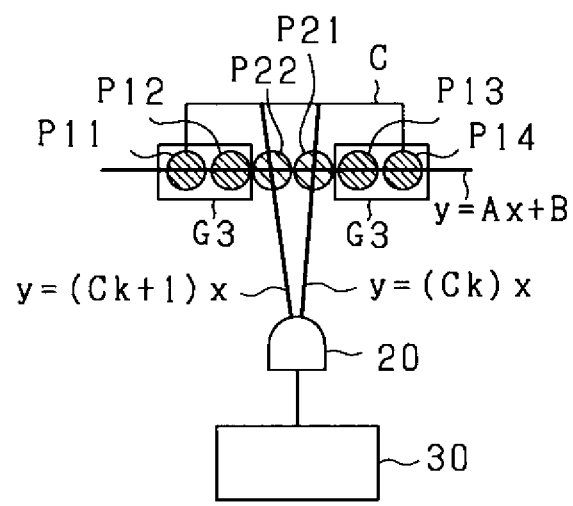
FIG. 26 pictorially shows how to supplement, with data acquired at weak-reflection points on an object, groups of reception-point data acquired at normal-reflection points on the object.

First of all, the foregoing embodiment has explained various methods for calculating the intersections, such as those shown in FIGS. 26 and 29. However, this calculation can be directed to a particular method for determining the intersections, such as to only that shown in FIG. 26 or FIG. 29, depending on the circumstances given to the detection area and moving characteristics of objects being recognized.

In the configuration illustrated in FIG. 26, it is not always necessary to obtain the intersections made between the first approximation linear line y=Ax+B and the respective continuous reflection directions, but simply decide points between the reflection points P12 and P13 by using, for example, an interpolating method.

The radar apparatus 20 is not limited to a ranging radar which employs the laser beam to scan an approx. 190 degrees direction area S ahead of the radar, but other types of radar apparatuses can be used, which cover a ranging radar which uses the laser beam to scan an approx. 120 degrees direction area ahead of the radar. Alternatively, a wide-angle ranging radar which uses the laser beam to scan an approx. 240 degrees direction area ahead of the radar.

The electromagnetic waves radiated from the radar apparatus can also be modified to use other types of propagating mediums provided higher directivity, hither straightness in propagation performance of the waves, such as millimeter waves or ultrasound waves, not always confined to use the laser beam descried.

The scan area can be set in a factory with the radar apparatus 20, not limited to be set in the indoor parking lot. In the scan area in the factory, vehicles being recognized are for instance forklifts and/or carrier vehicles. In addition, the radar apparatus 20 may be arranged on an outdoor road, in which stationary objects serving as the background pattern are for instance guard rails, rocks, and/or trees, all of which have a preset height. In the factory or on the outdoor road, a vehicle incoming direction into the detection area can be estimated and respective portions of the incoming vehicle can be patterned in relation to its light reflection points.

Figure 32:
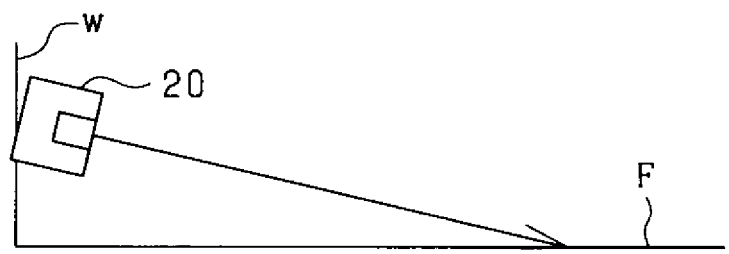
FIG. 32 shows a modification of installation of the radar apparatus.

As shown in FIG. 32, the radar apparatus 20 can be installed so that the laser beam is radiated obliquely downward. This radiation technique makes it possible to treat a floor F or a land surface as a stationary object even in a case where stationary objects (such as guard rails etc.) have no sufficient height to return the incident laser beam. In this case, the vehicle recognizing apparatus 30 is able to compensate for weak-reflection points as decried, thereby generating a compensated group of reflection-point data serving as a group of points indicating the vehicle, thereby proving more reliable vehicle recognition.

As another modification, the radar apparatus 20 and the vehicle recognizing apparatus 30 may be mounted on a moving object such as a vehicle. In this modification, the position and running speed of the moving object with the radar apparatus 20 are detected and such positon and speed information is used to correct a distance from the radar apparatus 20 to stationary objects and moving objects being recognized.

The present invention described above is not limited to the above-described embodiments and various modifications, but can be applied to various other embodiments without departing from the spirit thereof.

What is claimed is:

1. An apparatus for recognizing a vehicle, the apparatus cooperating with a radar apparatus that (i) radiates electromagnetic waves to a detection area at intervals to scan the detection area, the electromagnetic waves having a directivity, (ii) receives reflection waves at the intervals, and (iii) outputs data based on the received reflection waves, the apparatus comprising:

a memory device storing a non-transitory computer-readable program configured to recognize the vehicle based on the outputted data from the radar apparatus; and a processor programmed to execute the stored program and function as:

a stationary object determining unit determining, based on the outputted data, a distance from the radar apparatus to a stationary object in all radiation directions of the electromagnetic waves scanned across the detection area;

a reflection point determining unit positionally determining, based on the distances determined in all the radiation directions and the reflection waves in all the radiation directions, reflection points that reflect the electromagnetic waves, positions of the determined reflection points being closer to the radar apparatus than a position of the stationary object is to the radar apparatus;

a weak-reflection determining unit determining weak-reflection directions among the radiation directions of the electromagnetic waves, the weak-reflection directions passing weak-reflection points, which provide the reflection waves with intensities lower than a threshold;

a reflection-point group producing unit producing, from among the reflection points that are not the weak-reflection points, a common reflection point group defined as a group of reflection points estimated as belonging to a common vehicle;

a continuous-reflection detection determining unit determining, from the determined weak-reflection directions, one or more continuous reflection directions that are continuous in a scan direction to the radiation directions of the electromagnetic waves to the common reflection point group; and a point group generating unit, based on the vehicle having a rectangular contour in a plane including both of the radiation directions of the electromagnetic waves and the determined common reflection point group, determining the continuous reflection directions among the reflection directions to the common reflection point group, and supplementing the common reflection point group with the weak-reflection points.

2. The apparatus of claim 1, wherein the point group generating unit is configured to (i) determine whether the continuous reflection directions exist between two radiation directions among the radiation directions of the electromagnetic waves radiated to the reflection points contained in the common reflection point group, and (ii) supplement, with the weak-reflection points, reflection points spaced between the two radiation directions when the continuous reflection directions exist between two radiation directions.

3. The apparatus of claim 2, wherein:
the point group generating unit is configured to (i) determine whether the continuous reflection directions exist between two radiation directions among the radiation directions of the electromagnetic waves radiated to the reflection points contained in the common reflection point group, and, when the continuous reflection directions exist between two radiation directions, and (ii) supplement, with the weak-reflection points, reflection points spaced between the two radiation directions, such that the weak-reflection points are supplemented at intersections produced between a first approximation linear line and the respective continuous reflection directions, and
the first approximation linear line is a linear line passing reflection points located on any side of the rectangular contour of the object and included in all of the reflection points contained on the common reflection point group.

4. The apparatus of claim 2, wherein:
the point group generating unit is configured to (i) determine whether the radiation directions of the electromagnetic waves radiated to the common reflection point group are continuous to only one side of the continuous reflection directions in the scan direction, and (ii) supplement, with the weak-reflection points, at intersections at which a first linear line and a second linear line, upon determining that the radiation directions of the radiated electromagnetic waves are continuous to only the one side of the continuous reflection directions,
the first linear line is perpendicular to a second approximation linear line and passes, among the refection points, reflection points decided by a radiation direction located next to the continuous reflection directions in the scan direction,
the second approximation linear line approximating, on a linear line, the reflection points determined by the respective radiation directions of the electromagnetic waves to the common reflection point group, the first linear line, and
the second linear line indicating the respective continuous reflection directions.

5. The apparatus of claim 2, wherein the radar apparatus is configured to radiate the electromagnetic waves obliquely downward.

6. The apparatus of claim 2, wherein the processor is configured to further function as a vehicle recognizing unit recognizing, at least, as the object being recognized, the common vehicle based on the vehicle point group generated by the point group generating unit.

7. The apparatus of claim 1, wherein:
the point group generating unit is configured to (i) determine whether the continuous reflection directions exist between two radiation directions among the radiation directions of the electromagnetic waves radiated to the reflection points contained in the common reflection point group, and, when the continuous reflection directions exist between two radiation directions, and (ii) supplement, with the weak-reflection points, reflection points spaced between the two radiation directions, such that the weak-reflection points are supplemented at intersections produced between a first approximation linear line and the respective continuous reflection directions, and
the first approximation linear line is a linear line passing reflection points located on any side of the rectangular contour of the object and included in all of the reflection points contained on the common reflection point group.

8. The apparatus of claim 7, wherein the radar apparatus is configured to radiate the electromagnetic waves obliquely downward.

9. The apparatus of claim 7, wherein the processor is configured to further function as a vehicle recognizing unit recognizing, at least, as the object being recognized, the common vehicle based on the vehicle point group generated by the point group generating unit.

10. The apparatus of claim 1, wherein:
the point group generating unit is configured to (i) determine whether the radiation directions of the electromagnetic waves radiated to the common reflection point group are continuous to only one side of the continuous reflection directions in the scan direction, and (ii) supplement, with the weak-reflection points, at intersections at which a first linear line and a second linear line, upon determining that the radiation directions of the radiated electromagnetic waves are continuous to only the one side of the continuous reflection directions,
the first linear line is perpendicular to a second approximation linear line and passes, among the refection points, reflection points decided by a radiation direction located next to the continuous reflection directions in the scan direction,
the second approximation linear line approximating, on a linear line, the reflection points determined by the respective radiation directions of the electromagnetic waves to the common reflection point group, the first linear line, and
the second linear line indicating the respective continuous reflection directions.

11. The apparatus of claim 10, wherein the radar apparatus is configured to radiate the electromagnetic waves obliquely downward.

12. The apparatus of claim 10, wherein the processor is configured to further function as a vehicle recognizing unit recognizing, at least, as the object being recognized, the common vehicle based on the vehicle point group generated by the point group generating unit.

13. The apparatus of claim 1, wherein the radar apparatus is configured to radiate the electromagnetic waves obliquely downward.

14. The apparatus of claim 1, wherein the processor is configured to further function as a vehicle recognizing unit recognizing, at least, as the object being recognized, the common vehicle based on the vehicle point group generated by the point group generating unit.

15. A system for recognizing a vehicle, the system comprising:
a radar apparatus configured to:
radiate electromagnetic waves to a detection area at intervals to scanning a detection area, the electromagnetic waves having a directivity,
receive reflection waves at the intervals, and
output data based on the received reflection waves; and
an apparatus for recognizing the vehicle, the apparatus including:
a memory device storing a non-transitory computer-readable program configured to recognize the vehicle based on the outputted data from the radar apparatus; and
a processor programmed to execute the stored program and function as:
a stationary object determining unit determining, based on the outputted data, a distance from the radar apparatus to a stationary object in all radiation directions of the electromagnetic waves scanned across the detection area;
a reflection point determining unit positionally determining, based on the distances determined in all the radiation directions and the reflection waves in all the radiation directions, reflection points that reflect the electromagnetic waves, positions of the determined reflection points being closer to the radar apparatus than a position of the stationary object is to the radar apparatus;
a weak-reflection determining unit determining weak-reflection directions among the radiation directions of the electromagnetic waves, the weak-reflection directions passing weak-reflection points, which provide the reflection waves with intensities lower than a threshold;
a reflection-point group producing unit producing, from among the reflection points that are not the weak-reflection points, a common reflection point group defined as a group of reflection points estimated as belonging to a common vehicle;
a continuous-reflection detection determining unit determining, from the determined weak-reflection directions, one or more continuous reflection directions that are continuous in a scan direction to the radiation directions of the electromagnetic waves to the common reflection point group; and
a point group generating unit, based on the vehicle having a rectangular contour in a plane including both of the radiation directions of the electromagnetic waves and the determined common reflection point group, determining the continuous reflection directions among the reflection directions to the common reflection point group, and supplementing the common reflection point group with the weak-reflection points.

16. A non-transitory computer-readable storage medium storing a computer-readable program for recognizing a vehicle, which is executed by a computer, the computer being mounted in an apparatus cooperating with a radar apparatus that (i) radiates electromagnetic waves to a detection area at intervals to scan the detection area, the electromagnetic waves having a directivity, (ii) receives reflection waves at the intervals, and (iii) outputs data based on the received reflection waves, the computer-readable program, when executed by the computer, causes the computer to function as:
a stationary object determining unit determining, based on the outputted data, a distance from the radar apparatus to a stationary object in all radiation directions of the electromagnetic waves scanned across the detection area;
a reflection point determining unit positionally determining, based on the distances determined in all the radiation directions and the reflection waves in all the radiation directions, reflection points that reflect the electromagnetic waves, positions of the determined reflection points being closer to the radar apparatus than a position of the stationary object is to the radar apparatus;
a weak-reflection determining unit determining weak-reflection directions among the radiation directions of the electromagnetic waves, the weak-reflection directions passing weak-reflection points, which provide the reflection waves with intensities lower than a threshold;
a reflection-point group producing unit producing, from among the reflection points that are not the weak-reflection points, a common reflection point group defined as a group of reflection points estimated as belonging to a common vehicle;
a continuous-reflection detection determining unit determining, from the determined weak-reflection directions, one or more continuous reflection directions that are continuous in a scan direction to the radiation directions of the electromagnetic waves to the common reflection point group; and
a point group generating unit, based on the vehicle having a rectangular contour in a plane including both of the radiation directions of the electromagnetic waves and the determined common reflection point group, determining the continuous reflection directions among the reflection directions to the common reflection point group, and supplementing the common reflection point group with the weak-reflection points.

17. The non-transitory computer-readable storage medium according to claim 16, wherein the computer-readable program, when executed by the computer, causes the computer to recognize, at least, as the object being recognized, the common vehicle based on the vehicle point group generated by the point group generating unit.

* * * * *